Sept. 21, 1926.　　　　V. HABIB　　　　1,600,281

RADIATOR MOUNTING

Filed Nov. 14, 1925

Inventor

Vita Habib.

By Murray and Bugelter

Attorneys

Patented Sept. 21, 1926.

1,600,281

UNITED STATES PATENT OFFICE.

VITA HABIB, OF CINCINNATI, OHIO.

RADIATOR MOUNTING.

Application filed November 14, 1925. Serial No. 69,194.

An object of my invention is to provide an automobile radiator mounting which will minimize the possibility of damage to the radiator by vibration and the like.

Another object of my invention is to provide a simple and efficient means for mounting a radiator upon the frame of an automobile chassis.

Another object of my invention is to provide a radiator mounting which is cheap of manufacture.

Another object is to provide means for mounting a radiator which will not pull away from the lower tank thereof.

These and other objects are attained by the means described herein and disclosed in the accompanying drawings, in which.

Figure 1:
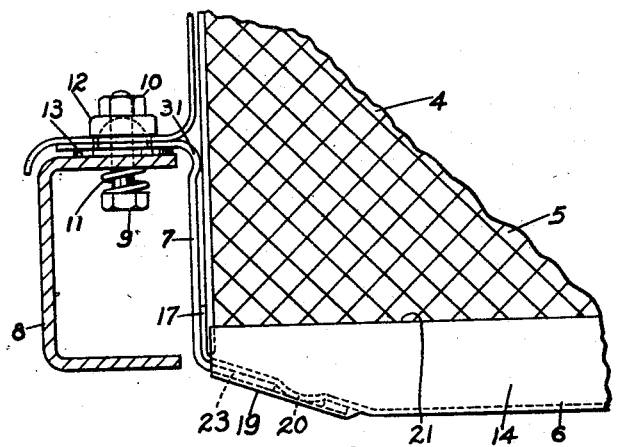
Fig. 1 is a front view of a radiator embodying my invention and secured to an automobile chassis.
Figures 2, 3:
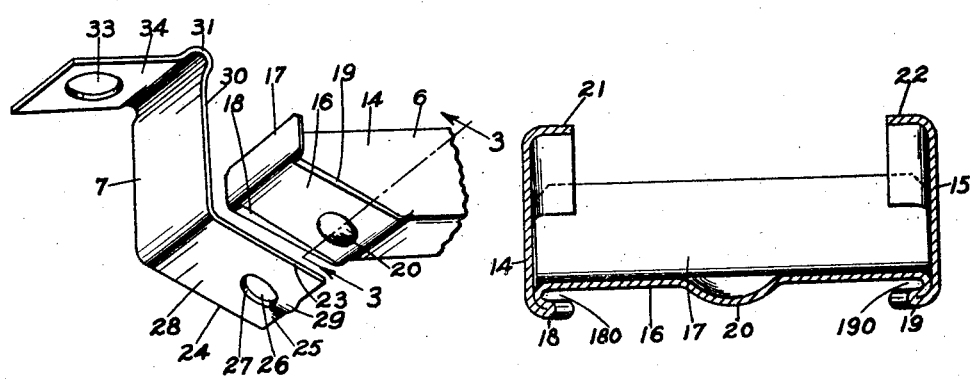
Fig. 2 is a perspective view of the bracket and lower tank of my invention.
Fig. 3 is a view on line 3—3 of Fig. 2.

A radiator 4 having the usual cooling section 5 is provided with a lower tank 6 of novel construction, upon which the cooling section is mounted. The ends of tank 6 are similar, therefore a description of one end will suffice for both. The tank 6 is a stamping of copper or other suitable material, and is provided at its ends with means for positively receiving and holding a bracket 7 which is adapted to be secured to chassis 8, of an automobile by any suitable means such as a usual bolt 9 and nut 10 in co-operation with a spring 11 and washers 12 and 13. Bracket 7, however, can be modified to fit all types of automobile frames.

The lower tank 6 comprises sides 14 and 15, an inclined face 16, an upwardly extending portion 17, flanges or guides 18 and 19, a boss 20 protruding outwardly from the inclined face 16, and longitudinal inwardly turned flanges 21 and 22 provided for mounting of the cooling section 5. The grooves 180 and 190 formed by the flanges or guides 18 and 19 are adapted to slidably receive the edges 23 and 24 of the lower inclined flange or arm 25 of bracket 7. A perforation 26 in the flange 25 of bracket 7 is adapted to receive the boss 20 when flange 25 of bracket 7 is in operative position in abutment with the inclined face 16. The resiliency of the flange provides a tight fit between the parts and separation thereof is difficult. Furthermore, after assembly, all joints are soldered including the boss 20 with edge 27 of perforation 26 and the flanges 18 and 19 with lower face 28 of flange 25. In this manner the bracket 7 is rigidly secured to the radiator 4 for supporting it on chassis 8 of an automobile.

If desired, a slight indentation 29 may be formed adjacent perforation 26 in alignment with the remaining portion of bracket 7 so as to facilitate entry of the boss 20 into perforation 26 against the normal resiliency of the flange. This is desirable in heavy construction. At the upper end 30 of bracket 7 is formed an inwardly extending rounded portion or rib 31 which abuts the radiator tube structure at a point considerably above the flanges 21 and 22. Any pressure which might be transmitted by the bracket 7 to the radiator will, by this construction, be transmitted to the radiator tubes at a point far enough from the soldered joints at the flanges 21 and 22 to preclude loosening of the solder at that point.

A perforation 33 is provided in the flange 34, which is substantially at right angles to the vertical portion 30 of bracket 7, for attachment to the frame or chassis 8. Obviously, the flange 34 is subject to modification for accommodating different styles of frames. Radiators of heretofore used type are frequently damaged by twisting and bending of the supporting portions of the chassis, the damage usually being the weakening of seams, and consequent leakage. In the device of my invention, these strains are taken by the brackets or support members. The connection between the brackets and the lower tank is of such strength as to preclude separation under practically all conditions.

What I claim is:

1. In a device of the class described the combination with an automobile radiator comprising a lower tank portion, said lower tank portion having its side walls folded upon themselves at their opposite ends to form integral grooved guides and inclined end wall portions, the end walls having depending bosses, mounting brackets adapted to be secured to an automobile chassis and perforate flanges on said brackets for entry into the grooves in the guides, the bosses on the inclined end walls seating in the perforations in the flanges.

2. In a device of the class described, the combination with an automobile radiator comprising a one-piece lower tank portion, said lower tank portion being formed at its opposite ends to provide grooved guides exteriorly of the tank, a lug adjacent the guides, and means engaging the guides and the lug for suspending said tank.

3. In a mounting means for automobile radiators, the combination with a radiator comprising a lower tank portion, of guides on said tank, a bracket member adapted for the mounting of the radiator on an automobile chassis, a flange on the bracket member for entry into the grooves formed by the guides on the tank body, and a transverse inwardly extending rib on the bracket member adapted to abut the radiator.

4. In a mounting means for automobile radiators, the combination with a radiator having a lower tank, of parallel guides on the tank, a boss formed on a surface of the tank, a bracket comprising flanges, one flange being adapted for entry between the guides, and provided with a perforation for seating on the boss on the tank, and means for securing the other flange of the bracket on an automobile frame.

5. The combination of an automobile radiator comprising a lower tank, inclined ends on the tank, guides and an outwardly protruding boss on each inclined end, a bracket member having a perforate flange, the flange adapted to be received between the guides and the perforation therein, adapted to register with the boss for precluding relative movement of the parts, and means for securing the bracket member to an automobile chassis.

6. As a new article of manufacture, a lower tank for radiators, flanges at opposite ends thereof, depending bosses adjacent the flanges, the flanges and bosses being adapted to receive respectively the edges and a perforation of a complementary bracket to preclude relative movement of the tank and the bracket.

7. As a new article of manufacture, a one-piece lower tank for automobile rediators having formed, integral with its walls, ends, and bottom, grooved flanges and depending bosses for receiving the edges and perforations respectively of radiator support members, for precluding relative movement of the tank and the support members.

8. The combination of an automobile radiator comprising a lower tank, inclined ends on the tank, guides and an outwardly protruding boss on each inclined end, a bracket member having a perforate flange, the flange being retained between the guides by the seating of the perforation on the boss, a second flange on the bracket member for securing the bracket member to an automobile frame, and a transverse rib on the bracket member adapted to abut the radiator.

In testimony whereof, I have hereunto subscribed my name this 12th day of November, 1925.

VITA HABIB.